United States Patent
Toya

(10) Patent No.: US 9,762,331 B2
(45) Date of Patent: Sep. 12, 2017

(54) OPTICAL COMMUNICATION APPARATUS AND METHOD OF CONTROLLING OPTICAL MODULATOR

(71) Applicant: Fujitsu Optical Components Limited, Kawasaki-shi, Kanagawa (JP)

(72) Inventor: Akihiro Toya, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 104 days.

(21) Appl. No.: 14/810,537

(22) Filed: Jul. 28, 2015

(65) Prior Publication Data

US 2016/0065310 A1 Mar. 3, 2016

(30) Foreign Application Priority Data

Aug. 28, 2014 (JP) ................................. 2014-174427

(51) Int. Cl.
*H04B 10/516* (2013.01)
*H04B 10/50* (2013.01)
*H04B 10/556* (2013.01)

(52) U.S. Cl.
CPC ... *H04B 10/5057* (2013.01); *H04B 10/50575* (2013.01); *H04B 10/5561* (2013.01)

(58) Field of Classification Search
None
See application file for complete search history.

(56) References Cited

U.S. PATENT DOCUMENTS

| 5,892,858 | A | * | 4/1999 | Vaziri | ..................... | H03M 5/18 |
| | | | | | | 341/57 |
| 6,239,897 | B1 | * | 5/2001 | Jackson | .................. | G02F 1/225 |
| | | | | | | 359/245 |
| 7,321,702 | B2 | * | 1/2008 | Akiyama | ............... | B82Y 20/00 |
| | | | | | | 385/1 |

(Continued)

FOREIGN PATENT DOCUMENTS

| JP | 2005-326548 | 11/2005 |
| JP | 2012-257164 | 12/2012 |

OTHER PUBLICATIONS

Patent Abstracts of Japan, Publication No. 2012-257164, published Dec. 27, 2012.

(Continued)

*Primary Examiner* — Tesfaldet Bocure
(74) *Attorney, Agent, or Firm* — Staas & Halsey LLP

(57) ABSTRACT

An optical communication apparatus includes an optical modulator having a Mach-Zehnder interferometer with a pair of waveguides and configured to modulate a phase of light emitted from a light source, a first controller configured to control a first substrate bias voltage or an amplitude of a first drive signal applied to a first waveguide of the waveguide pair of the optical modulator based upon an output of the optical modulator or a wavelength of the light source; and a second controller configured to control a second substrate bias voltage or an amplitude of a second drive signal applied to a second waveguide of the waveguide pair of the optical modulator independently from the first controller, based upon the output of the optical modulator or the wavelength of the light source.

8 Claims, 12 Drawing Sheets

(56) References Cited

U.S. PATENT DOCUMENTS

| | | | | |
|---|---|---|---|---|
| 8,818,141 | B1* | 8/2014 | Hochberg | H04B 10/505 385/2 |
| 9,020,363 | B2* | 4/2015 | Yasuda | H04B 10/50575 398/183 |
| 2005/0254743 | A1 | 11/2005 | Akiyama et al. | |
| 2012/0155880 | A1* | 6/2012 | Nishimoto | H04B 10/50572 398/79 |
| 2012/0281988 | A1* | 11/2012 | Kikuchi | H04B 10/5561 398/159 |
| 2013/0148981 | A1* | 6/2013 | Yasuda | H04B 10/548 398/185 |
| 2013/0155482 | A1* | 6/2013 | Toya | G02F 1/01 359/279 |
| 2013/0156444 | A1* | 6/2013 | Akashi | G02F 1/0123 398/186 |
| 2016/0056896 | A1* | 2/2016 | Toya | H04B 10/5053 398/183 |
| 2016/0056897 | A1* | 2/2016 | Toya | H04B 10/50575 398/183 |
| 2016/0147129 | A1* | 5/2016 | Nishimoto | G02F 1/2255 385/2 |

OTHER PUBLICATIONS

Patent Abstracts of Japan, Publication No. 2005-326548, published Nov. 24, 2005.

* cited by examiner (MODULATION INDEX) < 100%

(MODULATION INDEX) > 100%

(MODULATION INDEX) = 100%
LENGTH OF THE COMPOSITE VECTOR IS THE MAXIMUM
⇒ OUTPUT POWER OF MODULATED LIGHT IS THE MAXIMUM

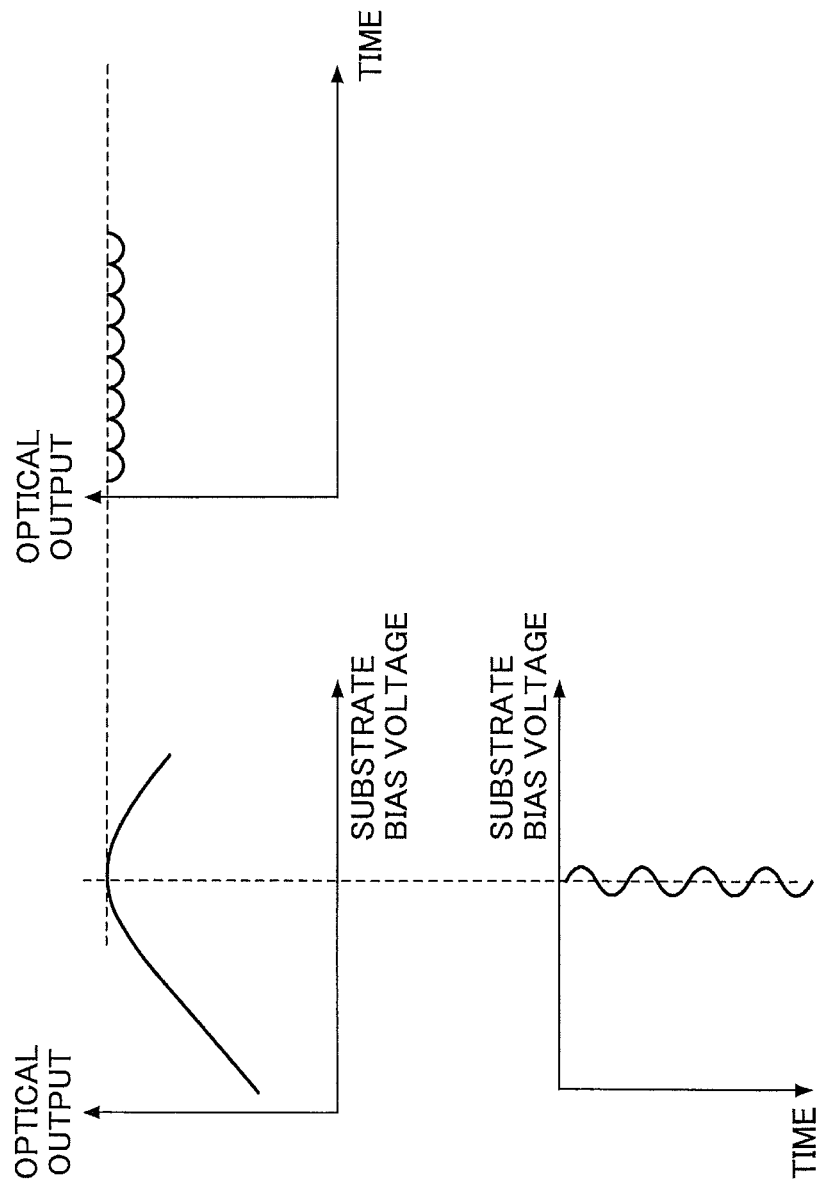

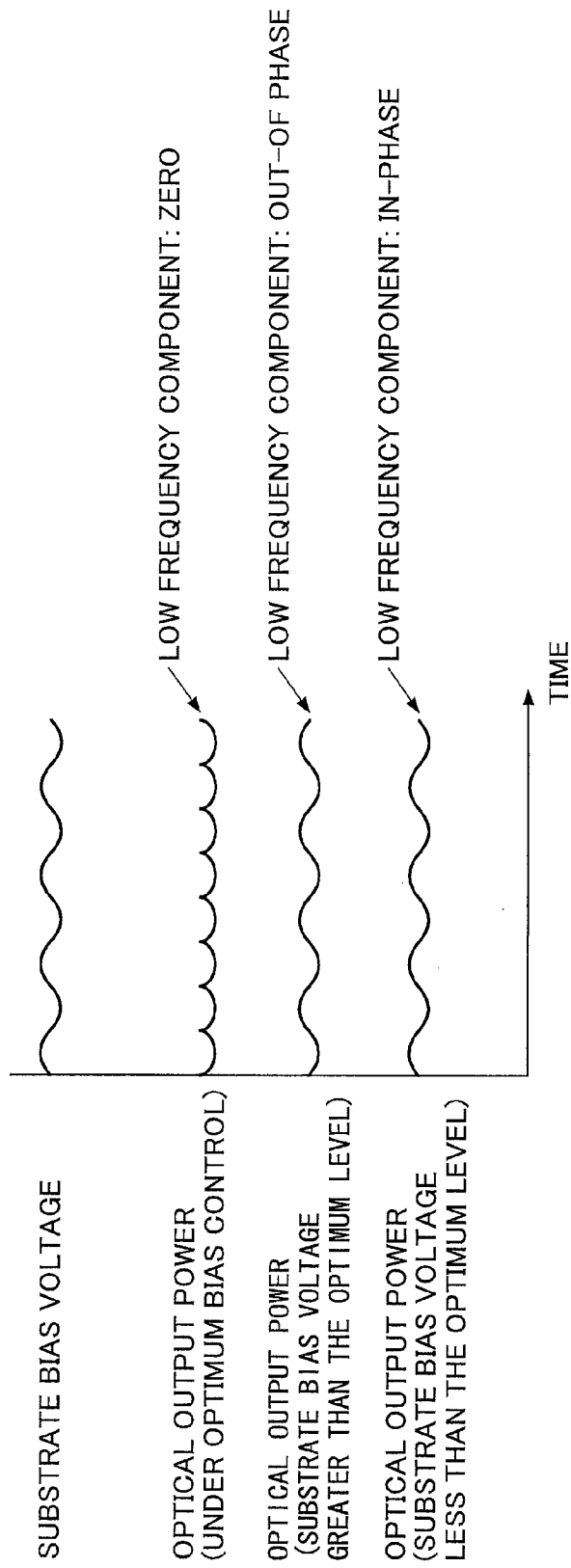

OPTICAL COMMUNICATION APPARATUS AND METHOD OF CONTROLLING OPTICAL MODULATOR

CROSS-REFERENCE TO RELATED APPLICATIONS

This application is based upon and claims the benefit of priority of the prior Japanese Patent Application No. 2014-174427 filed on Aug. 28, 2014, which is incorporated herein by references in its entirety.

FIELD

The disclosures herein relate to controlling of an optical modulator used in a fiber optic communication system.

BACKGROUND

In recent years, 100 Gigabit-per-second (Gbs) long-distance optical transmission has been implemented by dual-polarization quadrature phase-shift keying (DP-QPSK) using a digital coherent technology. To further improve transmission capacity, greater-level modulation schemes such as polarization division multiplexed 16 quadrature amplitude modulation (16-QAM) are being developed.

Meanwhile, demand for reducing the size of optical transceiver, which is used as a frontend module of optical transmission systems, is increasing. At present, Lithium niobate ($LiNbO_3$) Mach-Zehnder interferometer is typically used as an electro-optic modulator. In order to reduce a device size, it is desired to actualize multilevel modulation (e.g., DP-QPSK, DP-16 QAM, etc.) using a semiconductor Mach-Zehnder interferometer.

There is an intrinsic problem in semiconductor optical modulators in that the modulation characteristic (i.e., the relationship between applied voltage and optical phase change) varies depending on the wavelength of light input to the modulator. In semiconductor optical modulators, the absorption edge wavelength of the semiconductor material changes according to applied voltage, and the phase of light is modulated making use of the phase shift due to absorption based on Kramers-Kronig relations. Hence, semiconductor optical modulators have wavelength dependency such that the closer to the absorption-edge-wavelength the light to be modulated is, the greater the phase change with respect to the voltage change.

To address the wavelength dependency of the modulation characteristic of semiconductor optical modulators, several techniques for controlling a substrate bias voltage or amplitude of a drive signal according to the wavelength of input light are proposed. The first technique is to set the substrate bias voltage to a predetermined level according to the wavelength, and drive the modulator at a constant amplitude of a drive signal regardless of the wavelength. See, for example, Japanese Laid-open Patent Publication No. 2005-326548 A.

The second technique is to perform feedback control on the substrate bias voltage or drive signal amplitude. A low frequency signal is superimposed on driving data signals, and output light signals are monitored. Responsive to the monitoring result, the substrate bias voltage and/or the amplitude of the modulator drive signal is controlled. See, for example, Japanese Laid-open Patent Publication No. 2012-257164 A.

In Mach-Zehnder type semiconductor optical modulators, the voltage-to-phase characteristic or wavelength characteristic may vary between a pair of waveguides of a Mach-Zehnder interferometer, or the voltage-to-phase characteristic itself may change differently with time between the two waveguides. In addition, driving circuits or the driving amplitudes for driving the waveguide pair may vary differently with time.

With the above-described first and second techniques, the two waveguides are driven at the same amplitude with the same waveform, and a substrate bias voltage of the same level is applied to the two waveguides. Accordingly, if the driving amplitude or the voltage-to-phase characteristic varies between the two waveguides, or if these parameters change differently with age between the two waveguides, then the modulator is out of the optimum condition.

It is desired to provide an optical communication apparatus and a control technique for an optical modulator that can maintain the optimum modulating condition even if the voltage-to-phase characteristic varies between the two waveguides of a Mach-Zehnder interferometer, or even if the voltage-to-phase characteristic changes differently with time between the two waveguides.

SUMMARY

According to an aspect of the disclosures, an optical communication apparatus includes an optical modulator having a Mach-Zehnder interferometer with a pair of waveguides and configured to modulate a phase of light emitted from a light source;

a first controller configured to control a first substrate bias voltage or an amplitude of a first drive signal applied to a first waveguide of the waveguide pair of the optical modulator based upon an output of the optical modulator or a wavelength of the light source; and a second controller configured to control a second substrate bias voltage or an amplitude of a second drive signal applied to a second waveguide of the waveguide pair of the optical modulator independently from the first controller, based upon the output of the optical modulator or the wavelength of the light source.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 3A and FIG. 3B are diagrams to explain feedback control on a substrate bias voltage;

DESCRIPTION OF EMBODIMENTS

In binary phase shift keying (BPSK) or quadrature phase shift keying (QPSK), a Mach-Zehnder interferometer provides 0 and π radian phase-shifts. However, when the wavelength of the light beam output from a light source changes, the relationship between voltage and phase changes in the semiconductor optical modulator and the amount of phase shift of the modulated light from the optical modulator varies. In this case, phase modulation below π or over π radians is performed. The same thing happens when the amplitude of a driver output for driving the optical modulator fluctuates with time or according to temperature change, or when the voltage-to-phase characteristic of the optical modulator changes with time.

Figure 1A:
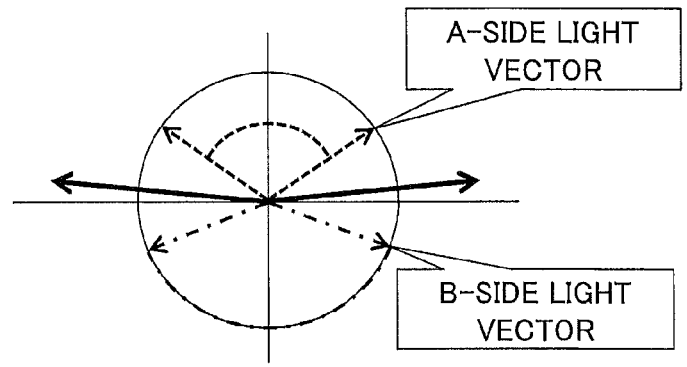
FIG. 1A through FIG. 1C illustrate a basic idea of controlling the modulation index of a Mach-Zehnder type optical modulator.
Figure 1B:
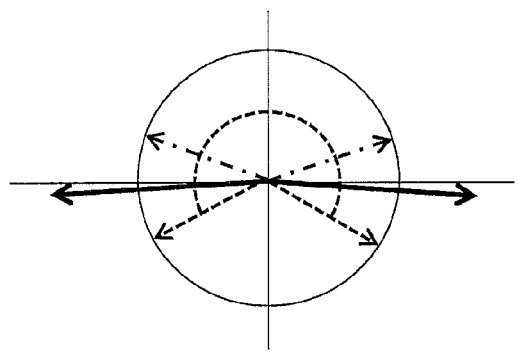
Figure 1C:
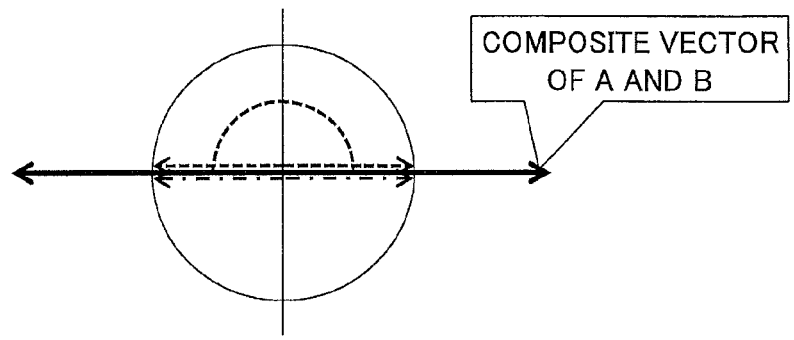

FIG. 1A to FIG. 1C illustrate a basic idea of controlling the modulation index of a Mach-Zehnder interferometer formed by a pair of waveguides. In FIG. 1A, the angle between the light vectors in the 0 and π phase directions on waveguide A of the Mach-Zehnder interferometer is smaller than π radians and the modulation index (or depth) is less than 100%. This may happen due to fluctuation or change with time in the characteristic. Similarly, the angle between the light vectors in the 0 and π phase directions on waveguide B of the Mach-Zehnder interferometer is offset from π radians, and provides a modulation index different from the waveguide A. In this example, the length of the composite vector of light beams traveling through the two waveguides is shorter than that of the composite vector at 100% modulation index.

In FIG. 1B, the angle between the light vectors in the 0 and π phase directions on waveguide A of the MZ interferometer is greater than π radians and the modulation index (or depth) is over 100%. The angle between the light vectors in the 0 and π phase directions on waveguide B is offset from π radians, and provides a modulation index different from the waveguide A. The length of the composite vector of light beams traveling through the two waveguides is again shorter than that of the composite vector at 100% modulation index.

In contrast, in FIG. 1C, the light beams travelling through the waveguides A and B both undergo 0 and π radian phase-shifts correctly. The composite vectors between waveguides A and B align with the 0 and π phase directions. The modulation index is 100% and the magnitude (or the length) of the composite vector become the maximum. In this case, the output power of the optical modulator becomes the maximum.

The embodiments propose to individually control substrate bias voltages or the driving amplitudes for the waveguide A and the waveguide B such that the output power level of the optical modulator becomes the maximum. This control scheme achieves stable 0 to π phase modulation even if the voltage-to-phase characteristic varies or undergoes different change with time between the two waveguides with the modulation index of 100%. To control the output power to the maximum, a low frequency signal, much lower than a driving frequency of the optical modulator, is applied to a substrate bias voltage. The low frequency component contained in the output signal from the optical modulator is monitored and the substrate bias voltage or the driving amplitude is controlled so as to minimize the low frequency component. Alternatively, the average light intensity of the output signal from the optical modulator may be monitored. In this case, the substrate bias voltage or the driving amplitude is controlled so as to maximize the average light intensity (or the average output power level).

First Embodiment

Figure 2:
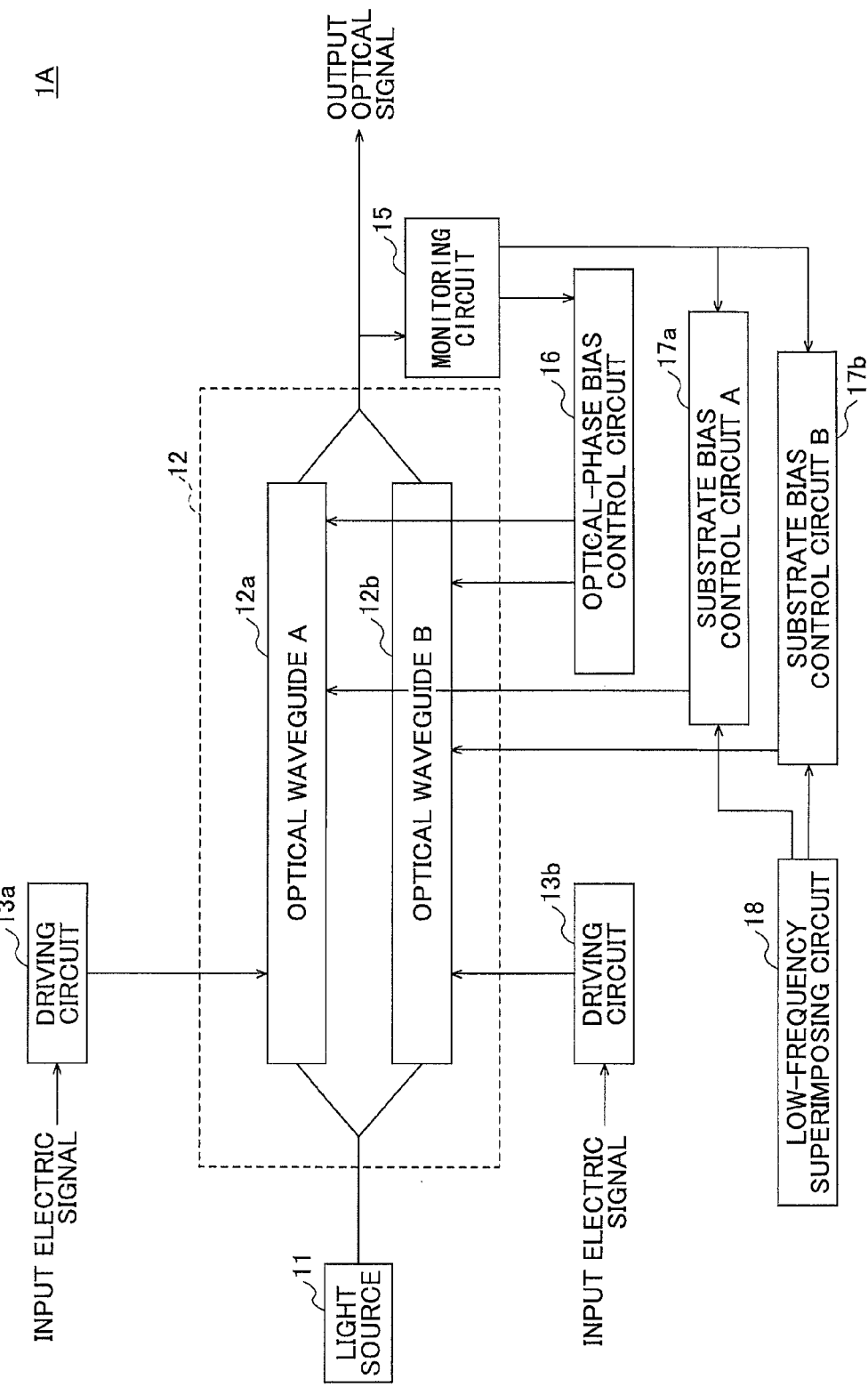
FIG. 2 is a schematic diagram of an optical transmitter according to the first embodiment.

FIG. 2 is a schematic diagram of an optical transmitter 1A, which is an example of an optical communication apparatus according to the first embodiment. In the first embodiment, the modulation index is controlled to 100% by individually controlling the substrate bias voltages applied to the two waveguides of a Mach-Zehnder interferometer to obtain the optimum output power.

The optical transmitter 1A has a light source 11, a Mach-Zehnder optical modulator 12 (hereinafter, which may be referred to simply as "optical modulator 12"), and driving circuits 13a and 13b for driving the optical modulator 12. The optical transmitter 1A also has a low-frequency superimposing circuit 18, an optical-phase bias control circuit 16, substrate bias control circuits 17a and 17b configured to control the optical waveguides (referred to simply as "waveguides") 12a and 12b of the optical modulator 12 independently from each other, and a monitoring circuit 15 to monitor a portion of the output signal from the optical modulator 12.

The light source 11 is, for example, a wavelength-tunable semiconductor laser suitable for use in WDM transmission systems. The optical modulator 12 is a semiconductor optical modulator with a pair of waveguides 12a and 12b. The amount of phase shift of light beams travelling through the waveguides 12a and 12b varies depending on the substrate bias voltage.

The light emitted from the light source 11 is guided to the optical modulator 12, and branched into the waveguides 12a and 12b. The driving circuits 13a and 13b amplify input electric signals and output high-frequency (e.g., 32 Gbps) drive signals to modulate the light beams propagating through the waveguides 12a and 12b, respectively. In the exemplified structure of FIG. 2, the amplitudes of the drive signals are set to a fixed level. The amplitude of the drive signals may be kept constant by, for example, performing feed-forward control on the driving circuits 13a and 13b in response to a temperature change or fluctuation in power source. The light beams having undergone the phase modulation at the waveguides 12a and 12b are combined and the combined light is output from the optical modulator 12. In FIG. 2, electrodes to which high-frequency drive signals and direct-current (DC) substrate biases are applied are omitted.

The low-frequency superimposing circuit 18 generates a low frequency signal whose frequency is sufficiently low (for example, several kilohertz), compared with the frequency of the drive signal. The low frequency signal is supplied to the substrate bias control circuits 17a and 17b separately under time sharing control.

During a control interval in which the low frequency signal is supplied to the substrate bias control circuit 17a, the substrate bias control circuit 17a applies a substrate bias voltage on which the low frequency signal is superimposed to the waveguide 12a. The monitoring circuit 15 supplies a monitor signal to the substrate bias control circuit 17a. During this interval, the substrate bias voltage applied to the waveguide 12b is the same level as that set in the previous control. The substrate bias control circuit 17a controls the substrate bias voltage applied to the waveguide 12a such that the low frequency component contained in the monitor signal becomes the minimum.

During a control interval in which the low frequency signal is supplied to the substrate bias control circuit 17*b*, the substrate bias control circuit 17*b* applies a substrate bias voltage on which the low frequency signal is superimposed to the waveguide 12*b*. The monitoring circuit 15 supplies a monitor signal to the substrate bias control circuit 17*b*. During this interval, the substrate bias voltage applied to the waveguide 12*a* is the same level as that set in the previous control interval. The substrate bias control circuit 17*b* controls the substrate bias voltage applied to the waveguide 12*b* such that the low frequency component contained in the monitor signal becomes the minimum. The control operations performed by the substrate bias control circuits 17*a* and 17*b* are independent from each other.

FIG. 3A and FIG. 3B are diagrams to explain the substrate bias control on the basis of the monitoring result of the low frequency component or the output power level. As illustrated in the upper left of FIG. 3A, the output power level becomes the maximum at the optimum level of the substrate bias voltage. In this case, the waveform of the low frequency component applied to the substrate bias is folded back, and a frequency twice the superimposed low frequency is detected as illustrated in the right-hand side of FIG. 3A. The superimposed low frequency itself is not detected, and accordingly, the magnitude of the low frequency component in the monitor signal becomes the minimum (or zero). If the substrate bias voltage is greater than the optimum level, a low frequency component with the phase opposite to that of the superimposed low frequency signal is detected, as illustrated in FIG. 3B. If the substrate bias voltage is less than the optimum level, a low frequency component in-phase with the superimposed low frequency signal is detected. The substrate bias voltages applied to the waveguide 12*a* and the waveguide 12*b* are controlled individually such that the detected low frequency component becomes the minimum (or zero). Consequently, the substrate bias voltages of the waveguides 12*a* and 12*b* are set to the optimum level respectively. In place of detecting the low frequency component, the output power level of the optical modulator 12 may be monitored. In this case, the substrate bias voltages for the waveguides 12*a* and 12*b* are controlled individually such that the average output power level becomes the maximum.

Returning to FIG. 2, the substrate bias control circuit 17*a* compares the low frequency component contained in the monitor signal with the low frequency signal generated by the low-frequency superimposing circuit 18 to determine the quantity and direction (increase or decrease) of control on the substrate bias voltage applied to the waveguide 12*a*. The substrate bias control circuit 17*b* compares the low frequency component contained in the monitor signal with the low frequency signal generated by the low-frequency superimposing circuit 18 to determine the quantity and direction (increase or decrease) of control on the substrate bias voltage applied to the waveguide 12*b*.

By individually controlling the two waveguides 12*a* and 12*b* of the Mach-Zehnder interferometer of the optical modulator 12, the modulation conditions of the waveguides 12*a* and 12*b* are maintained in the optimum regardless of a difference in voltage-to-phase characteristic or in change with time between the two waveguides 12*a* and 12*b*.

The output signal from the monitoring circuit 15 may be supplied to the optical-phase bias control circuit 16. The optical-phase bias control circuit 16 controls a phase bias voltage applied to the waveguides 12*a* and 12*b*. The phase bias is a bias voltage that regulates a static phase difference between the light beams modulated at the waveguides 12*a* and 12*b*. With an optical phase modulation scheme, the phase bias voltage is controlled such that the center of the amplitude of the drive signal comes to the minimum point of the light intensity curve (modulation curve) representing the voltage to light intensity characteristic of the optical modulator 12. By performing the voltage control such that the monitored low frequency component is minimized, the amplitude center of the drive signal can be brought to the minimum point of the modulation curve.

Second Embodiment

Figure 4:
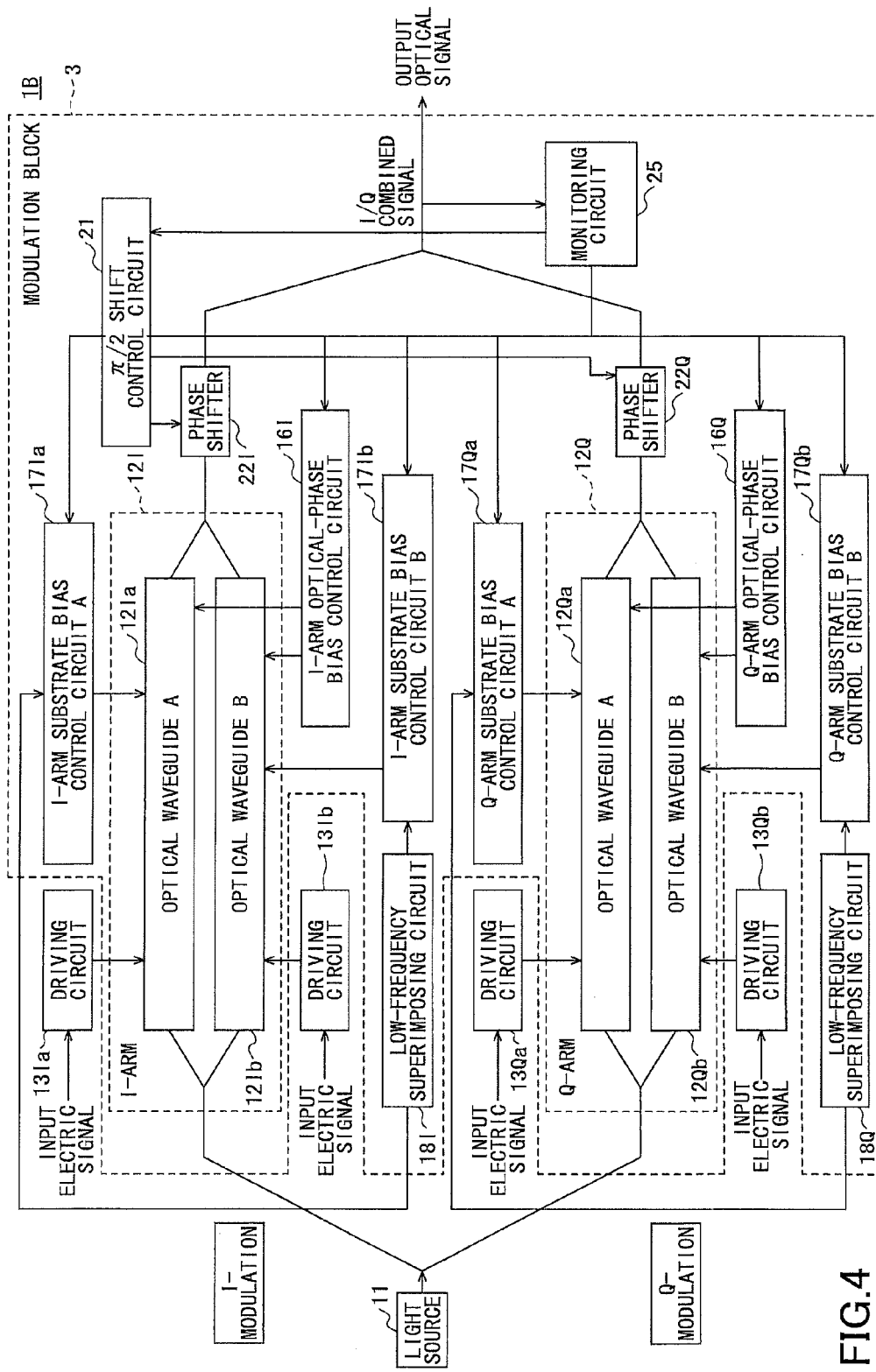
FIG. 4 is a schematic diagram of an optical transmitter according to the second embodiment.

FIG. 4 is a schematic diagram of an optical transmitter 1B, which is an example of an optical communication apparatus according to the second embodiment. The optical transmitter 1B is used for quadrature phase shift keying (QPSK) or quadrature amplitude modulation (QAM). The optical transmitter 1B has an in-phase (I) arm and a quadrature-phase (Q) arm of Mach-Zehnder interferometers.

The light emitted from the light source 11 is split into two paths and guided to the Mach-Zehnder optical modulator 12I (which may be referred to simply as "I-arm modulator 12I") and the Mach-Zehnder optical modulator 12Q (which may be referred to simply as (Q-arm modulator 12Q) of a modulation block 3. In each of the I-arm modulator 12I and the Q-arm modulator 12Q, the input light is split into two paths and guided to waveguide A and waveguide B. The output light from the I-arm modulator 12I and the output light from the Q-arm modulator 12Q undergo phase adjustment at a phase shifter 22I and a phase shifter 22Q, respectively, so as to produce a phase difference of $\pi/2$ radians (i.e., 90 degrees) between the light beams from the I-arm modulator 12I and the Q-arm modulator 12Q. The light beams with $\pi/2$ phase difference are combined and output from the modulation block 3.

A portion of the combined light containing the in-phase (I) component and the quadrature-phase (Q) component is monitored at a monitoring circuit 25. The monitoring result is supplied to a $\pi/2$ shift control circuit 21, I-arm substrate bias control circuits 17Ia and 17Ib, and Q-arm substrate bias control circuits 17Qa and 17Qb. When performing phase bias control based upon the low frequency component, the monitoring result may also be supplied to the optical-phase bias control circuits 16I and 16Q.

In the I-arm modulator 12I, high-frequency drive signals are applied from driving circuits 13Ia and 13Ib to the waveguides 12Ia and 12Ib, respectively, to modulate the light beams at a high speed. In the Q-arm modulator 12QI, high-frequency drive signals are applied from driving circuits 13Qa and 13Qb to the waveguides 12Qa and 12Qb, respectively, to modulate the light beams at a high speed. Both the I-arm modulator 12I and the Q-arm modulator 12Q are semiconductor optical modulators, such as indium phosphide (InP) modulators. Upon application of a voltage, the absorption edge wavelength of the semiconductor material changes, and the light phase is modulated making use of a phase shift due to the absorption according to Kramers-Kronig relations. The output light from the I-arm modulator 12I and the output light from the Q-arm modulator 12Q are combined after a $\pi/2$ phase difference is added. The resultant light beam is a QPSK signal that has undergone quadrature phase shift keying.

In the I-arm modulator 12I, the substrate bias voltage applied to the waveguide 12Ia and the substrate bias voltage applied to the waveguide 12Ib are controlled individually by the I-arm substrate bias control circuits 17Ia and 17Ib. In the Q-arm modulator 12Q, the substrate bias voltage applied to the waveguide 12Qa and the substrate bias voltage applied to the waveguide 12Qb are controlled individually by the I-arm substrate bias control circuits 17Qa and 17Qb.

On the I-arm side, a low frequency signal is supplied from a low frequency superimposing circuit 18I to the I-arm substrate bias control circuits 17Ia and 17Ib under time sharing control. The I-arm substrate bias control circuit 17Ia slightly modulates a substrate bias voltage for the waveguide 12Ia with the low frequency signal. The I-arm substrate bias control circuit 17Ib slightly modulates a substrate bias voltage for the waveguide 12Ib with the low frequency signal. Similarly, on the Q-arm side, a low frequency signal is supplied from a low frequency superimposing circuit 18Q to the I-arm substrate bias control circuits 17Qa and 17Qb under time sharing control. The Q-arm substrate bias control circuit 17Qa slightly modulates a substrate bias voltage for the waveguide 12Qa with the low frequency signal. The I-arm substrate bias control circuit 17Qb slightly modulates a substrate bias voltage for the waveguide 12Qb with the low frequency signal. A single low frequency superimposing circuit 18 may be used in common between the I-arm modulation and Q-arm modulation.

A portion of the combined light containing I-phase modulated light and Q-phase modulation light is input as a monitor light to the monitoring circuit 25. The monitor light is converted to an electric current and then converted into a monitor signal. During the control interval for the substrate bias control circuit 17Ia, the monitoring circuit 25 supplies the monitor signal to the substrate bias control circuit 17Ia. During the control interval for the substrate bias control circuit 17Ib, the monitor signal is supplied to the substrate bias control circuit 17Ib. In the respective control intervals, the substrate bias control circuits 17Ia and 17Ib carry out synchronous detection of the low frequency component contained in the monitor signal and individually control the substrate bias voltages applied to the waveguide 12Ia and 12Ib. Similarly, the substrate bias control circuits 17Qa and 17Qb carry out synchronous detection of the low frequency component contained in the monitor signal and individually control the substrate bias voltages applied to the waveguide 12Qa and 12Qb during the associated control intervals.

Each of the optical-phase bias control circuits 16I and 16Q controls a phase bias voltage based upon the detection of the low frequency component. The phase bias voltage is slightly modulated by the low frequency signal, and the phase bias voltage is controlled such that the low frequency component contained in the monitor signal approaches zero. Under this phase bias control, the phase difference between the light beams on the two waveguides A and B of a Mach-Zehnder interferometer is adjusted.

With this configuration, each of the waveguides of a Mach-Zehnder interferometer is maintained in the optimum condition even though the voltage-to-phase characteristic varies between the two waveguides at the I-arm and/or the Q-arm of a Mach-Zehnder type optical modulator.

Although some connection lines are omitted in FIG. 4 for the purpose of simplification, the low frequency signal may be supplied from the low frequency superimposing circuit 18I or 18Q to a $\pi/2$ shift control circuit 21. The $\pi/2$ shift control circuit 21 slightly modulates a $\pi/2$ phase shift bias voltage with the low frequency signal, and controls the $\pi/2$ shift bias voltage so as to bring the low frequency component contained in the alternating current component of the monitor signal closer to zero. The substrate bias, the optical-phase bias, and the $\pi/2$ shift bias may be controlled independently and in parallel using separate circuits, or alternatively, time sharing control may be performed using a CPU.

Third Embodiment

Figure 5:
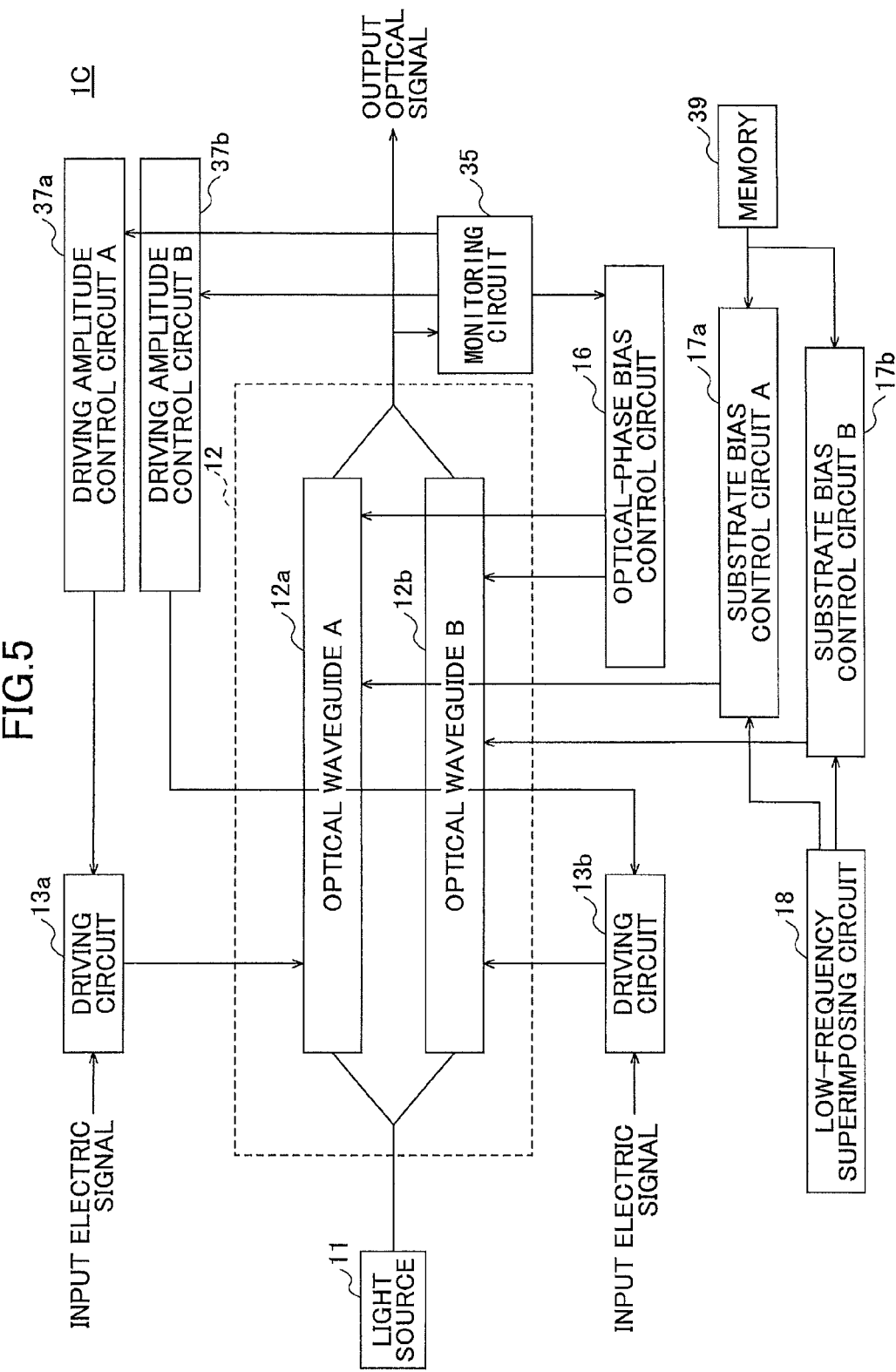
FIG. 5 is a schematic diagram of an optical transmitter according to the third embodiment.

FIG. 5 is a schematic diagram of an optical transmitter 1C, which is an example of an optical communication apparatus according to the third embodiment. In the third embodiment, the amplitudes of drive signals applied to a pair of waveguides of a Mach-Zehnder interferometer are controlled individually, in place of the substrate bias voltage, to achieve the modulation index of 100%.

The structure of the optical transmitter 1C is similar to those of the optical transmitter 1A of the first embodiment. Explanation is made to differing points.

Driving circuits 13a and 13b are provided for a pair of waveguides 12a and 12b of the optical transmitter 12. A driving amplitude control circuit 37a is provided for the driving circuit 13a, and a driving amplitude control circuit 37b is provided for the driving circuit 13b. The driving amplitude control circuits 37a and 37b independently carry out feedback control on the driving amplitudes of the driving circuits 13a and 13b.

During the control interval of the driving amplitude control circuit 37a, the low frequency superimposing circuit 18 supplies a low frequency signal to the substrate bias control circuit 17a. A substrate bias voltage with the low frequency signal superimposed is applied by the substrate bias control circuit 17a to the waveguide 12a. The monitoring circuit 35 monitors a portion of the output light from the optical modulator 12, and supplies the monitoring result (monitor signal) to the driving amplitude control circuit 37a. The driving amplitude control circuit 37a carries out synchronous detection of the low frequency component contained in the monitor signal and controls the amplitude of the drive signal generated by the driving circuit 13a so as to minimize the low frequency component.

During the control interval of the driving amplitude control circuit 37b, the low frequency superimposing circuit 18 supplies a low frequency signal to the substrate bias control circuit 17b. A substrate bias voltage with the low frequency signal superimposed is applied by the substrate bias control circuit 17b to the waveguide 12b. The monitoring circuit 35 monitors a portion of the output light from the optical modulator 12, and supplies the monitoring result (monitor signal) to the driving amplitude control circuit 37b. The driving amplitude control circuit 37b carries out synchronous detection of the low frequency component contained in the monitor signal and controls the amplitude of the drive signal generated by the driving circuit 13b so as to minimize the low frequency component. The control operations of the driving amplitude control circuits 37a and 37b are independent from each other. Even if the operation behavior fluctuates between the driving circuits 13a and 13b, each of the waveguides 12a and 12b is driven at the optimum driving amplitude. Consequently, the modulation index for the light beam input to the optical modulator 12 can be regulated to 100%.

In the example of FIG. 5, feed-forward control is performed on the substrate bias voltages applied to the waveguides 12a and 12b according to the wavelength of the light source. For example, a table or a relational expression describing the relation between wavelength and substrate bias voltage level may be stored in a memory 29 in advance. The substrate bias control circuits 17a and 17b read a substrate bias value corresponding to the currently used wavelength from the memory 39 and set the substrate bias voltages for the waveguides 12a and 12b individually.

Although in the example of FIG. 5, the low frequency signal is superimposed on the substrate bias voltages applied to the waveguides 12a and 12b, the low frequency signal may be superimposed on the drive signal, in place of the substrate bias voltage. The low frequency signal may be supplied to the optical-phase bias control circuit 16 to perform feedback control on the phase bias voltage although the connection lines are omitted in the figure.

Fourth Embodiment

Figure 6:
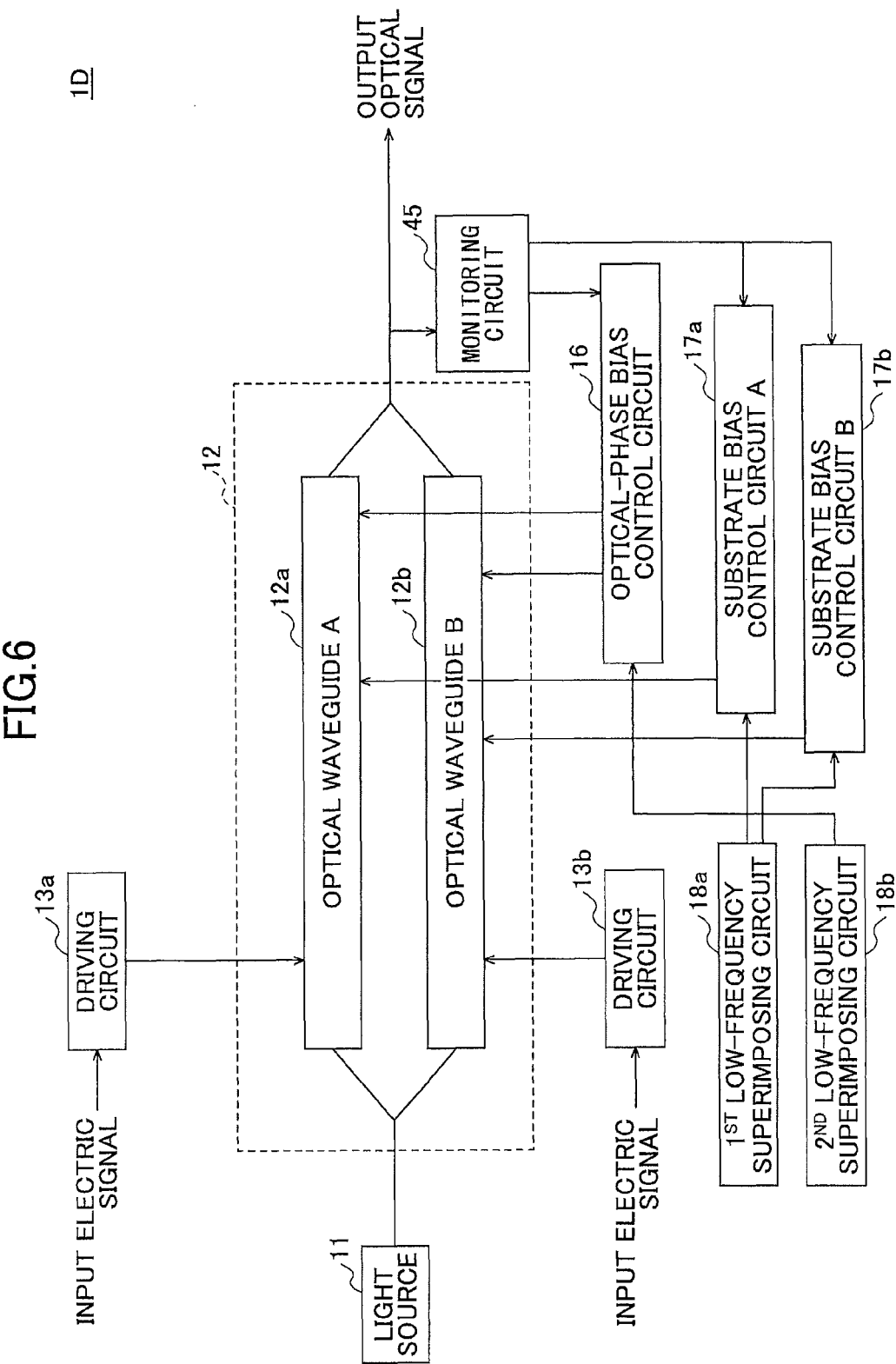
FIG. 6 is a schematic diagram of an optical transmitter according to the fourth embodiment.

FIG. 6 is a schematic diagram of an optical transmitter 1D, which is an example of an optical communication apparatus according to the fourth embodiment. In the fourth embodiment, first and second low frequency signals are used. One of the low frequency signals (e.g., the first low frequency signal) is superimposed on the substrate bias voltage, and the other (e.g., the second low frequency signal) is superimposed on the phase bias voltage. The substrate bias voltage and the phase bias voltage are controlled simultaneously to reduce the control duration.

The low-frequency superimposing circuit 18a supplies a first low frequency signal to the substrate bias voltage circuits 17a and 17b separately in a time sharing manner. The low-frequency superimposing circuit 18b supplies a second low frequency signal, which frequency is different from that of the first low frequency signal, to the optical-phase bias control circuit 16.

During the control interval of the substrate bias control circuit 17a, the first low frequency signal is superimposed on the substrate bias voltage applied to the waveguide 12a. Simultaneously, the second low frequency signal is superimposed on the phase bias voltage applied to the waveguide 12a. (The electrode for substrate bias and the electrode for phase bias are omitted in the figure.) The monitoring circuit 45 monitors a portion of the output light from the optical modulator 12, and supplies the monitoring result (monitor signal) to the substrate bias control circuit 17a and the optical-phase bias control circuit 16. The substrate bias control circuit 17a compares the phase of the first low frequency component contained in the monitor signal with the phase of the first low frequency signal generated by the low-frequency superimposing circuit 18a (synchronous detection), and controls the substrate bias voltage applied to the waveguide 12a so as to minimize the first low frequency component in the monitor signal. The optical-phase bias control circuit 16 controls the phase bias voltage applied to the waveguides 12a and 12b so to minimize the second low frequency component contained in the monitor signal.

During the control interval of the substrate bias control circuit 17b, the first low frequency signal is superimposed on the substrate bias voltage applied to the waveguide 12b. Simultaneously, the second low frequency signal is superimposed on the phase bias voltage applied to the waveguide 12b. The monitoring circuit 45 monitors a portion of the output light from the optical modulator 12, and supplies the monitoring result (monitor signal) to the substrate bias control circuit 17b and the optical-phase bias control circuit 16. The substrate bias control circuit 17b compares the phase of the first low frequency component contained in the monitor signal with the phase of the first low frequency signal generated by the low-frequency superimposing circuit 18a (synchronous detection), and controls the substrate bias voltage applied to the waveguide 12b so as to minimize the first low frequency component in the monitor signal. The optical-phase bias control circuit 16 controls the phase bias voltage applied to the waveguides 12a and 12b so to minimize the second low frequency component contained in the monitor signal.

The structure of FIG. 6 may be applied to QPSK modulation. In this case, time sharing control may be performed among (a) substrate bias control for the waveguide A of I-arm MZ interferometer and I-arm phase bias control, (b) substrate bias control for the waveguide B of the I-arm MZ interferometer and I-arm phase bias control, (c) substrate bias control for the waveguide A of the Q-arm MZ interferometer and Q-arm phase bias control, (d) substrate bias control for the waveguide B of the Q-arm MZ interferometer and Q-arm phase bias control, and (e) π/2 shift bias control.

Fifth Embodiment

Figure 7:
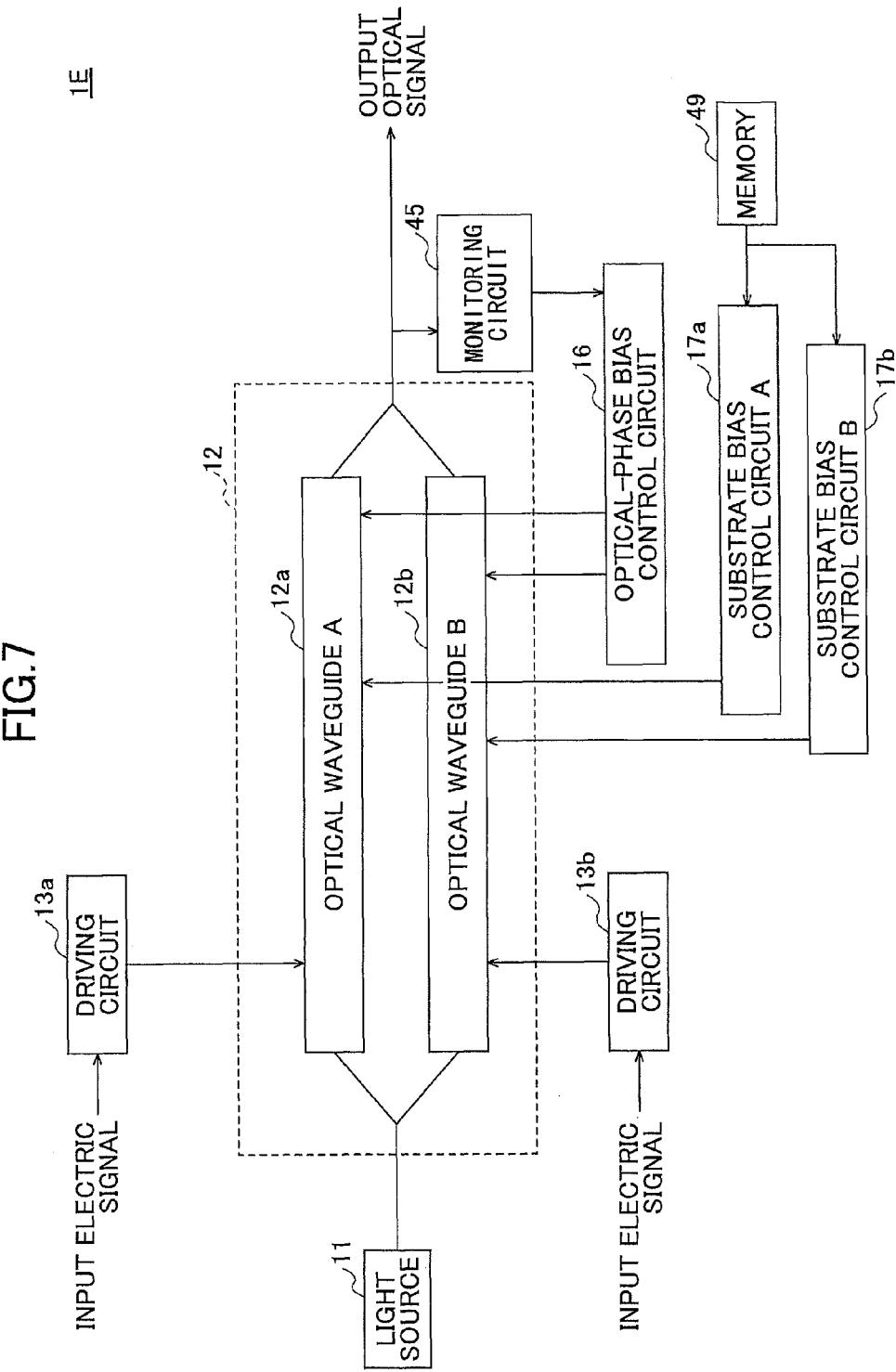
FIG. 7 is a schematic diagram of an optical transmitter according to the fifth embodiment.

FIG. 7 is a schematic diagram of an optical transmitter 1E, which is an example of an optical communication apparatus according to the fifth embodiment. In the fifth embodiment, feed-forward control is performed individually on the substrate bias voltage for the waveguide 12a and the substrate bias voltage for the waveguides 12b.

A memory 49 has a table or a relational expression describing the relation between wavelength and substrate bias voltage level for the substrate bias control circuit 17a, and a table or a relational expression describing the relation between wavelength and substrate bias voltage level for the substrate bias control circuit 17b. The substrate bias control circuit 17a reads a voltage level responsive to the wavelength of the light source from the corresponding table or the relational expression in the memory 49 to control the substrate bias voltage applied to the waveguide 12a. The substrate bias control circuit 17b reads a voltage level responsive to the wavelength of the light source from the corresponding table or the relational expression in the memory 49 to control the substrate bias voltage applied to the waveguide 12b.

By reflecting the wavelength characteristic into the substrate bias voltage for the waveguide 12a and the substrate bias voltage for the waveguides 12b individually, variations in the modulation characteristic between the waveguide 12a and the waveguide 12b can be corrected. This arrangement is effective especially when change with time (or age) is small.

Regarding the phase bias voltage, feedback control using the monitoring circuit 45 may be performed as illustrated in FIG. 7, or alternatively, feed-forward control responsive to the wavelength may be performed. The amplitudes of the drive signals generated by the driving circuits 13a and 13b may be fixed to predetermined values.

Sixth Embodiment

Figure 8:
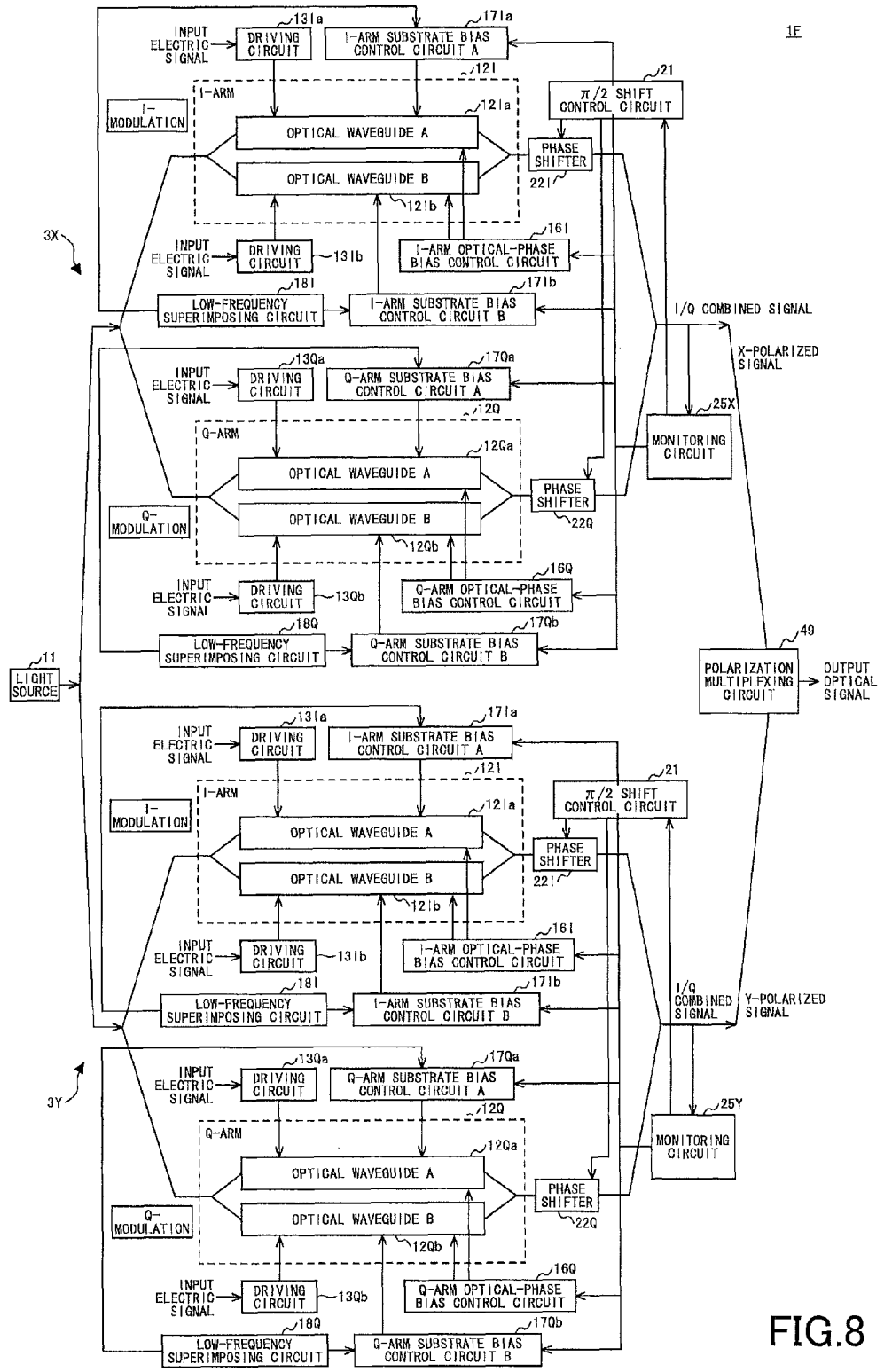
FIG. 8 is a schematic diagram of an optical transmitter according to the sixth embodiment.

FIG. 8 is a schematic diagram of an optical transmitter 1F, which is an example of an optical communication apparatus according to the sixth embodiment. In the sixth embodiment, control for achieving a modulation index of 100% in a Mach-Zehnder type optical modulator is applied to DP-QPSK.

The light emitted from the light source 11 is split into two paths and guided to an X-polarization modulation block 3X and Y-polarization modulation block 3Y. In each of the modulation blocks 3X and 3Y, the light beam is further split into two paths and input to a Mach-Zehnder optical modulator 12I (which may be referred to simply as "I-arm modulator 12I" and a Mach-Zehnder optical modulator 12Q (which may be referred to simply as "Q-arm modulator 12Q"). The X-polarization modulation block 3X and the Y-polarization modulation block 3Y are the same as the modulation block 3 for QPSK illustrated in FIG. 4, and the redundant explanation is omitted. A monitoring circuit 25X is provide for the X-polarization modulation block 3X and a monitoring circuit 25Y is provided for the Y-polarization modulation block 3Y. The substrate bias voltage, the phase bias voltage, and the $\pi/2$ shift bias voltage are feedback controlled using a low frequency signal at each of the modulation blocks 3X and 3Y.

In each of the I-arm and the Q-arm of the X-polarization modulation block 3X, the substrate bias voltages of the two waveguides are controlled in, for example, time sharing manner based upon the monitoring result of the monitoring circuit 25X. In each of the I-arm and the Q-arm of the Y-polarization modulation block 3Y, the substrate bias voltages of the two waveguides are controlled in, for example, time sharing manner based upon the monitoring result of the monitoring circuit 25Y. Controlling on the phase bias voltage and the $\pi/2$ shift bias voltage for the respective polarized components is the same as those explained in the second embodiment.

X-polarized modulated signal and Y-polarized modulated signal are combined at a polarization multiplexing circuit 49 and output as an optical transmission signal. Instead of providing separate monitoring circuits 25X and 25Y for the respective polarization modulation blocks 3X and 3Y, a portion of the output light from the polarization multiplexing circuit 49 may be monitored.

In FIG. 7, stable 0 and $\pi$ phase-shifts (100% modulation index) is realized by individually controlling the substrate bias voltages of the two waveguides. In place of the structure of FIG. 7, the amplitudes of the drive signals applied to the two waveguides may be controlled individually as in the third embodiment. In this case, the structure of FIG. 5 is adapted in each of the X-polarization modulation block 3X and the Y-polarization modulation block 3Y.

Seventh Embodiment

Figure 9:
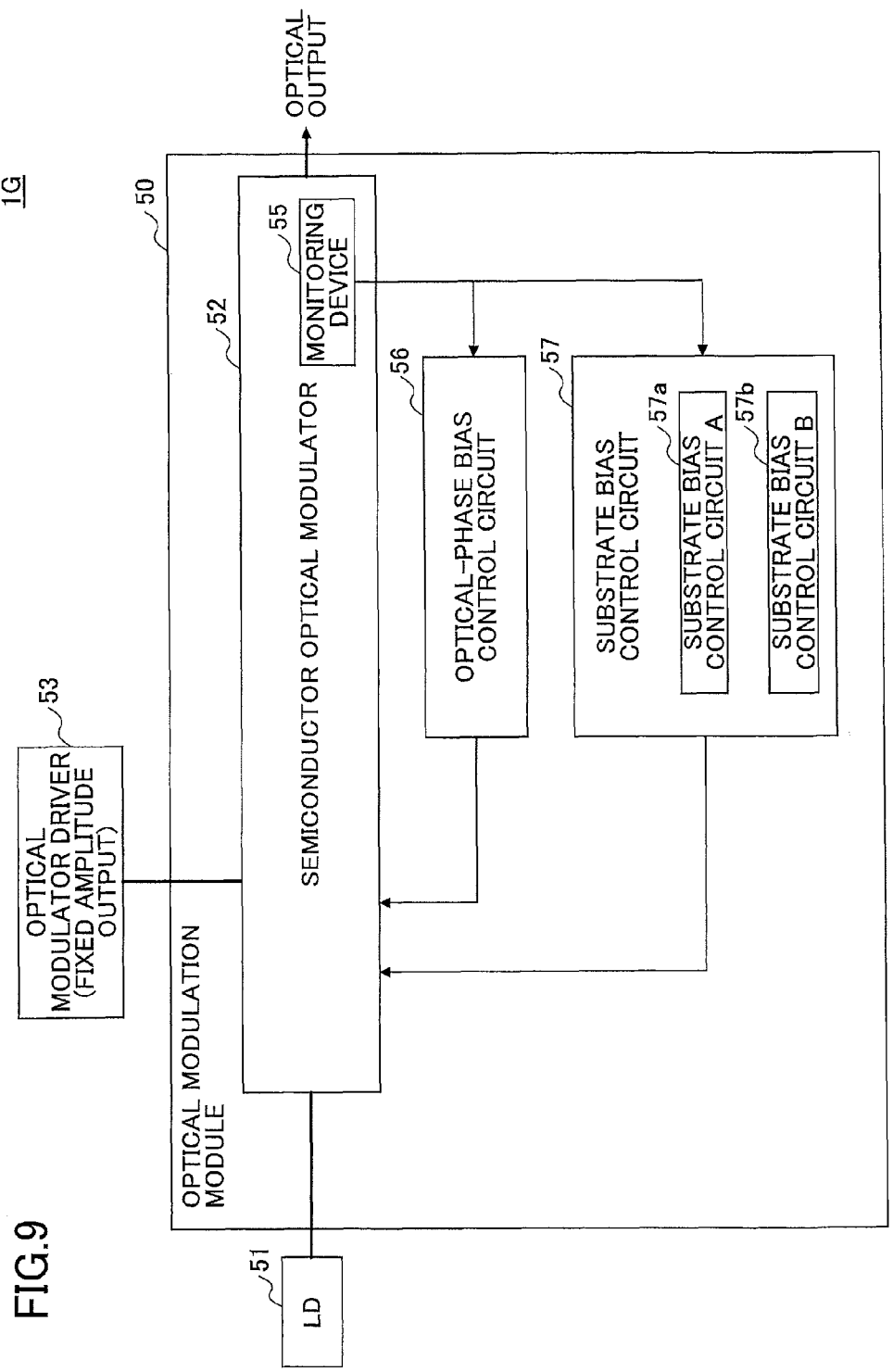
FIG. 9 is a schematic diagram of an optical transmitter according to the seventh embodiment.

FIG. 9 is a schematic diagram of an optical transmitter 1G, which is an example of an optical communication apparatus, according to the fifth embodiment. The optical transmitter 1G has a laser diode (LD) 51 used as a light source, an optical modulator module 50, and a modulator driver 53. In the optical transmitter 1G, a semiconductor optical modulator 52 with a monitoring device 55, an optical-phase bias control circuit 56, and a substrate bias control circuit 57 are accommodated in an optical modulation module 50. The substrate bias control circuit 57 includes substrate bias control circuits 57a and 57b provided corresponding to a pair of waveguides of a Mach-Zehnder interferometer of the semiconductor optical modulator 52. The substrate bias control circuit 57 has a low frequency superimposing circuit 18 (see FIG. 2, etc.) that repeatedly generates a low frequency signal to be superimposed on the substrate bias voltage. The monitoring circuit 55 has, for example, a photo detector, and converts the detected light signal to an electric signal, which electric signal is supplied to the substrate bias control circuits 57a and 57b. The electric signal output from the monitoring circuit 55 may also be supplied to the optical-phase bias control circuit 56, thereby controlling the phase bias voltage applied to the semiconductor optical modulator 52.

The substrate bias control circuits 57a and 57b that individually control the two waveguides of an MZ interferometer of the semiconductor optical modulator 52 are arranged in the optical modulation module 50. Consequently, stable 0 and $\pi$ phase-shifts are realized with a simple structure regardless of variations in voltage-to-phase characteristics or different change with time occurring between the two waveguides.

Although in this example the optical modulation module 50 is designed based upon the structure of FIG. 2, the QPSK optical modulation block 3 of FIG. 4 may be provided in the optical modulation module 50. In this case, the driving circuits 13Ia, 13Ib, 13Qa, and 13Qb may be provided outside the optical modulation module 50. Alternatively, the DP-QPSK optical modulation block 3X and 3Y and the polarization multiplexing circuit 49 of FIG. 8 may be accommodated in the optical modulation module 50.

In place of the feedback control, a feed-forward control mechanism illustrated in FIG. 7 may be provided in the optical modulation module 50 to individually control the substrate bias voltages responsive to a wavelength.

In either case, the driving amplitude or the substrate bias voltage is controlled individually for the two waveguide of a MZ interferometer, and the optical transmitter 1G that can maintain the modulation index of 100% in a stable manner is implemented as a compact module.

Eighth Embodiment

Figure 10:
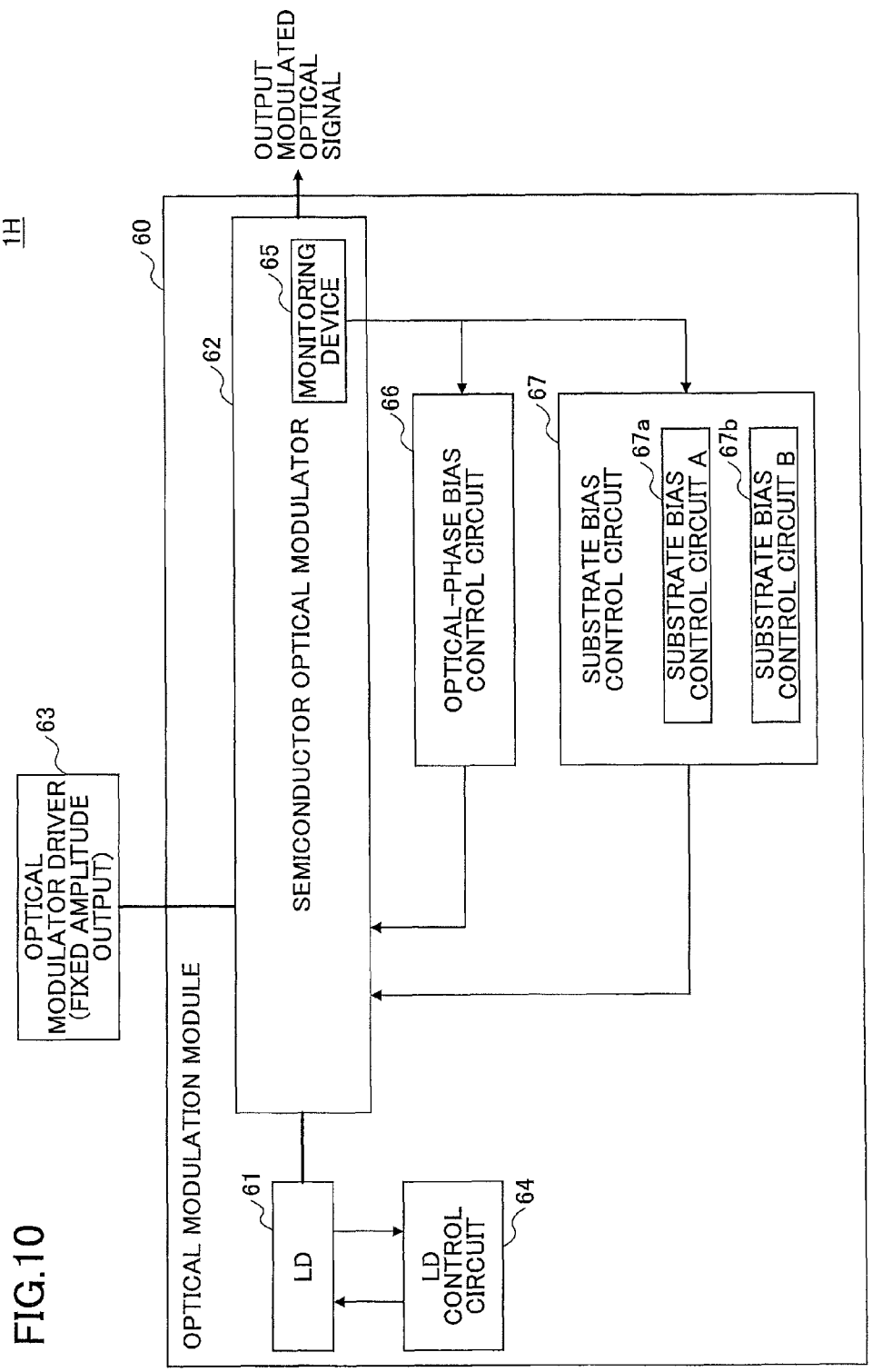
FIG. 10 is a schematic diagram of an optical transmitter according to the eighth embodiment.

FIG. 10 is a schematic diagram of an optical transmitter 1H, which is an example of an optical communication apparatus, according to the eighth embodiment. The optical transmitter 1H has an optical modulation module 60 and a modulator driver 63.

In the optical transmitter 1H, a semiconductor optical modulator 62 with a monitoring device 55, an optical-phase bias control circuit 66, a substrate bias control circuit 67, a light source (LD) 61, and a light source (LD) control circuit 64 are accommodated in an optical modulation module 60. The substrate bias control circuit 67 includes substrate bias control circuits 67a and 67b provided corresponding to a pair of waveguides of a Mach-Zehnder interferometer of the semiconductor optical modulator 62.

Although in this example the optical modulation module 60 is designed based upon the structure of FIG. 2, the QPSK optical modulation block 3 of FIG. 4 may be provided in the optical modulation module 60. In this case, the driving circuits 13Ia, 13Ib, 13Qa, and 13Qb may be provided outside the optical modulation module 60. Alternatively, the DP-QPSK optical modulation block 3X and 3Y and the polarization multiplexing circuit 49 of FIG. 8 may be accommodated in the optical modulation module 50. In place of the feedback control, a feed-forward control mechanism illustrated in FIG. 7 may be provided in the optical modulation module 60 to individually control the substrate bias voltages responsive to a wavelength. In this case, the modulator driver 63 may be provided outside the optical modulation module 60.

Ninth Embodiment

Figure 11:
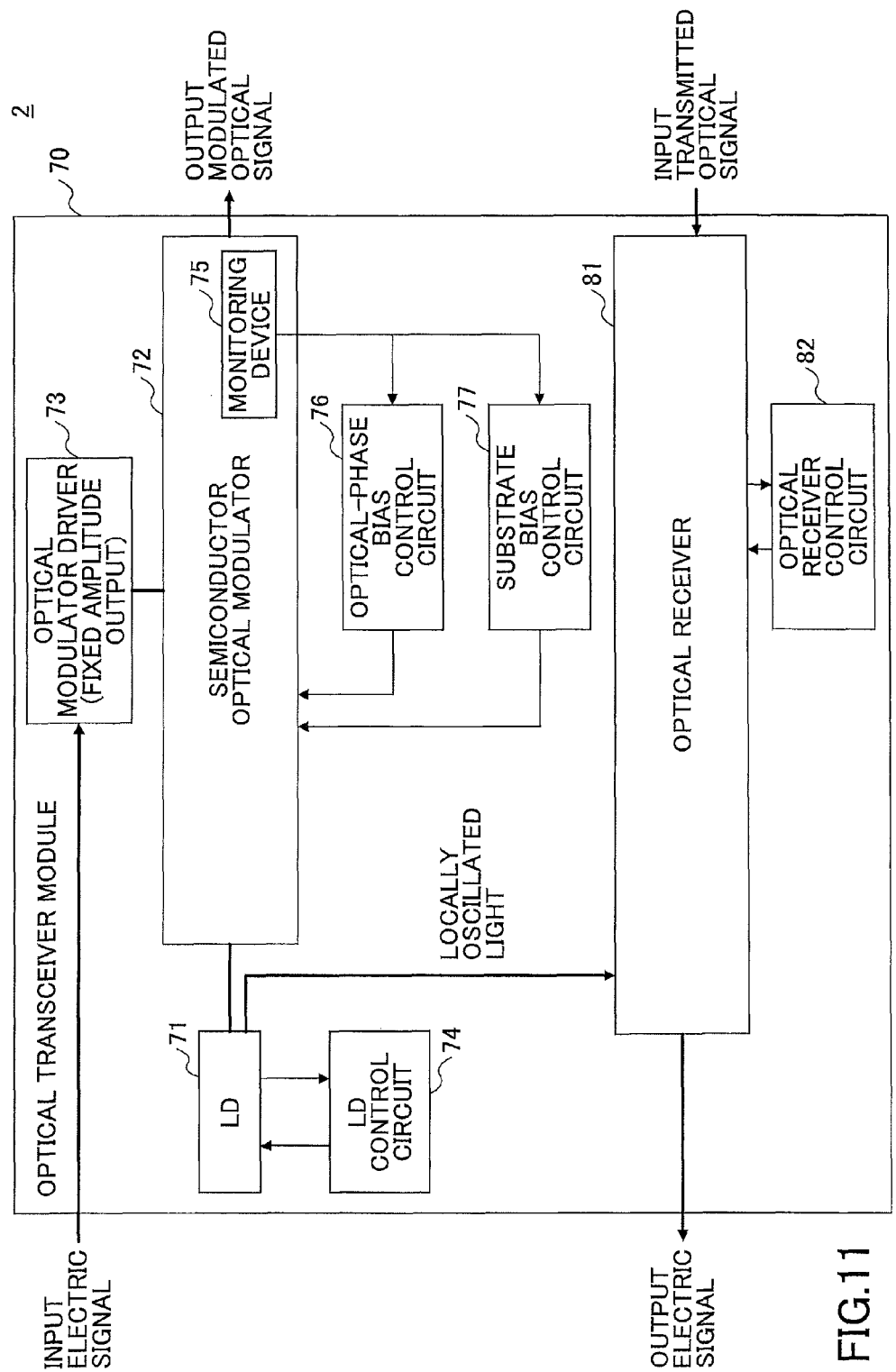
FIG. 11 is a schematic diagram of an optical transceiver according to the ninth embodiment.

FIG. 11 is a schematic diagram of an optical transceiver 2, which is an example of an optical communication apparatus, according to the ninth embodiment. In the optical transceiver 2, a transmission system and a receiving system are accommodated in an optical transceiver module 70. The transmission system includes a semiconductor optical modulator 72 with a monitoring device 75, an optical modulator driver 73, a light source unit, and a bias control unit. The light source unit includes a light source (LD) 71 and a light source (LD) control circuit 74. The bias control unit includes an optical-phase bias control circuit 76 and a substrate bias control circuit 77.

The receiving system includes an optical receiver 81 and an optical receiver control circuit 82. A portion of the light beam output from the LD 71 is branched and input as a local oscillation light to the optical receiver 81. The optical receiver 81 mixes the received light signal with the local oscillation light to perform coherent light detection. The detected light is subjected to optical-to-electric conversion and current-to-voltage conversion, and an electric signal is output from the optical receiver 81. This configuration implements a compact optical transceiver frontend module.

Although in this example the transmission system of the optical transceiver module 70 is designed based upon the structure of the first embodiment (FIG. 2), the QPSK optical transmitter of FIG. 4 may be used in the optical transceiver module 70. The DP-QPSK optical transmitter of FIG. 8 may also be accommodated in the optical modulation module 70. In addition, the feed-forward control mechanism for individually controlling the substrate bias voltages as illustrated in FIG. 7 may be employed.

Throughout the first to the ninth embodiments, the individual feedback control on the two waveguides may be performed by slightly modulating the substrate bias voltages with the low frequency signal and controlling the substrate bias voltages individually such that the low frequency component contained in the output signal from the optical modulator. As an alternative, the substrate bias voltages for the two waveguides may be controlled individually such that the average light intensity of the optical modulator become the maximum. Two or more of the first through ninth embodiments may be combined arbitrarily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication apparatus comprising:
   an optical modulator having a Mach-Zehnder interferometer with a pair of waveguides and configured to modulate a phase of light emitted from a light source;
   a first controller configured to control a first substrate bias voltage or an amplitude of a first drive signal applied to a first waveguide of the waveguide pair of the optical modulator based upon an output of the optical modulator or a wavelength of the light source; and
   a second controller configured to control a second substrate bias voltage or an amplitude of a second drive signal applied to a second waveguide of the waveguide pair of the optical modulator independently from the first controller, based upon the output of the optical modulator or the wavelength of the light source, the second substrate bias voltage being controlled separately from a phase bias voltage applied to the first waveguide and the second waveguide.

2. The optical communication apparatus according to claim 1, further comprising:
   a low frequency superimposing circuit configured to generate a low frequency signal superimposed on the first substrate bias voltage applied to the first waveguide and the second substrate bias voltage applied to the second waveguide,
   wherein the low frequency superimposing circuit supplies the low frequency signal individually to the first controller and the second controller,
   the first controller controls the first substrate bias voltage or the amplitude of the first drive signal so as to minimize a low frequency component contained in the output of the optical modulator, and
   the second controller controls the second substrate bias voltage or the amplitude of the second drive signal independently from the first controller so as to minimize the low frequency component contained in the output of the optical modulator.

3. The optical communication apparatus according to claim 1, further comprising:
   a first low frequency superimposing circuit configured to generate a first low frequency signal superimposed on the first substrate bias voltage and the second substrate bias voltage;
   a second low frequency superimposing circuit configured to generate a second low frequency signal superimposed on the phase bias voltage applied to the first waveguide and the second waveguide, the second low frequency signal having a frequency different from the first low frequency signal; and
   an optical-phase bias controller configured to control the phase bias voltage,
   wherein the control on the first substrate bias voltage by the first controller and the control on the phase bias voltage by the optical-phase bias controller are performed simultaneously, and
   wherein the control on the second substrate bias voltage by the second controller and the control on the phase bias voltage by the optical-phase bias controller are performed simultaneously.

4. The optical communication apparatus according to claim 1, wherein the first controller and the second controller control the first substrate bias voltage and the second substrate bias voltage, respectively and independently from each other, such that an average light intensity of the output of the optical modulator becomes the maximum.

5. The optical communication apparatus according to claim 1, further comprising:
   a memory configured to record a first substrate bias level for the first waveguide and a second substrate bias level for the second waveguide in association with a wavelength of the light source,
   wherein the first controller and the second controller read the first substrate bias level and the second substrate bias level, respectively, from the memory and control the first substrate bias voltage and the second substrate voltage independently from each other.

6. The optical communication apparatus according to claim 1, further comprising:
   a driving circuit configured to generate the first drive signal and the second drive signal and supply the first and second drive signals to the optical modulator,
   wherein the optical modulator, the first controller and the second controller are arranged in a single component, and the driving circuit is arranged outside the component.

7. The optical communication apparatus according to claim 1, further comprising:

a driving circuit configured to generate the first drive signal and the second drive signal and supply the first and second drive signals to the optical modulator; and an optical receiver configured to receive an optical signal having propagated through an optical transmission path and output an electric signal representing the optical signal, wherein the optical modulator, the first controller, the second controller, the driving circuit, and the optical receiver are arranged in a single component.

8. A method of controlling an optical modulator configured to modulate a phase of light from a light source using a Mach-Zehnder interferometer, comprising:

controlling a first substrate bias voltage or an amplitude of a first drive signal applied to a first waveguide of the Mach-Zehnder interferometer according to an output of the optical modulator or a wavelength of the light source, and controlling a second substrate bias voltage or an amplitude of a second drive signal applied to a second waveguide of the Mach-Zehnder interferometer, independently from the first substrate bias voltage or the amplitude of the first drive signal, according to the output of the optical modulator or the wavelength of the light source, the second substrate bias voltage being controlled separately from a phase bias voltage applied to the first waveguide and the second waveguide.

* * * * *